(12) United States Patent
Amoroso et al.

(10) Patent No.: US 7,926,107 B2
(45) Date of Patent: Apr. 12, 2011

(54) INTERNET SECURITY NEWS NETWORK

(75) Inventors: Edward Amoroso, Morris County, NJ (US); Daniel Rubin, Somerset County, NJ (US); Barbara Laing, Monmouth County, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 1015 days.

(21) Appl. No.: 11/408,160

(22) Filed: Apr. 21, 2006

(65) Prior Publication Data

US 2007/0192613 A1 Aug. 16, 2007

Related U.S. Application Data

(60) Provisional application No. 60/736,321, filed on Nov. 15, 2005.

(51) Int. Cl.
*G06F 11/00* (2006.01)
*G06F 12/14* (2006.01)
*G06F 12/16* (2006.01)
*G08B 23/00* (2006.01)

(52) U.S. Cl. ........... 726/22; 713/179; 340/531; 348/9

(58) Field of Classification Search ............ 726/22, 726/26
See application file for complete search history.

(56) References Cited

U.S. PATENT DOCUMENTS

| 5,512,935 | A * | 4/1996 | Majeti et al. ............ 725/33 |
| 7,373,395 | B2 * | 5/2008 | Brailean et al. ......... 709/219 |
| 7,389,539 | B1 * | 6/2008 | Kouznetsov ............ 726/22 |
| 2004/0250133 | A1 * | 12/2004 | Lim ...................... 713/201 |
| 2005/0044418 | A1 * | 2/2005 | Miliefsky ................ 713/201 |
| 2005/0183138 | A1 * | 8/2005 | Phillips et al. .......... 726/11 |
| 2006/0248407 | A1 * | 11/2006 | Adams et al. ........... 714/43 |
| 2006/0253584 | A1 * | 11/2006 | Dixon et al. ............ 709/225 |
| 2006/0273893 | A1 * | 12/2006 | Warner .................. 340/531 |

OTHER PUBLICATIONS

AT&T plans CNN-style security channel (http://www.networkworld.com/news/2005/062305-att-cnn-security.html) By Stephen Lawson and Robert McMillan, IDG News Service, Jun. 23, 2005.*
Citadel's 2 Minute Warning Provides Early Defense Intelligence Against Worms and Other Cyber Security Threats (printed from http://www.marketwire.com/mw/release_html_b1?release_id=93304), Aug. 17, 2005.
About the Internet Storm Center (ISC) ISC History and Overview Internet page: http://www.isc.sans.org/about.php, Jan. 23, 2006.

* cited by examiner

*Primary Examiner* — Taghi T. Arani
*Assistant Examiner* — Mahfuzur Rahman
(74) *Attorney, Agent, or Firm* — Moazzam & Associates, LLC

(57) ABSTRACT

A system and method are disclosed for collecting, analyzing, verifying, producing, and broadcasting security data. Internet security-related information may be broadcast continuously from a data center over a broadcast channel, such as a webcast. As additional security related information is received at the data center, the data is analyzed and video content is produced to describe the incoming data. Video content may take the form of urgent near real-time security alerts, or pre-scheduled programs describing recent news and developments related to internet security. In an alternative embodiment, security news alerts are multi-cast to a selected group of users and the news alert data encrypted so that the group of users may trust its source.

17 Claims, 3 Drawing Sheets

INTERNET SECURITY NEWS NETWORK

This application claims priority to U.S. Provisional Patent Application No. 60/736,321 filed on Nov. 15, 2005 and entitled "INTERNET SECURITY NEWS NETWORK." Said provisional U.S. application is incorporated herein by reference in its entirety for all purposes.

This application is related to the co-pending U.S. application Ser. No. 11/321,060 entitled "Internet Security Updates Via Mobile Phone Videos," filed Dec. 30, 2005, the contents of which are hereby incorporated by reference in their entirety for all purposes.

BACKGROUND

The present invention relates to the field of internet security and, more particularly, to the field of collecting internet security news data and, as soon as possible thereafter, providing multi-cast or broadcast internet security alerts to internet users.

Information technology (IT) professionals rely on receiving current and accurate system and network security information. A security threat on the network, such as an internet virus outbreak or an intrusion onto a private network, must be detected and acted upon quickly to protect the resources on the system. Less urgent information such as security tips and techniques from experts, news, and internet "traffic" and "weather" data may be equally valuable. Many common systems provide passive notifications, such as web pages, which are updated by an administrator when new information becomes available. A user may log on and browse to the web page to view the current network status and a listing of current or past security alerts. Active notifications may also be sent to subscribers through electronic mail (email), pager, voice mail, fax, SMS, or instant messaging. Such notifications may arrive in a subscriber's mailbox, in the case of email or voice mail, or may be presented on the subscriber's computer terminal. However, the source of the presented information may be questionable or unreliable and so not be trusted by the user or discarded as SPAM.

When system or network security-relation data is identified as valuable to customers, a short video segment may be prepared and posted to a website for customers to find and watch. Similarly, when time-sensitive security information is received, a forensic analysts may review the information before posting an alert on a website for customers to monitor, or reporting this information by phone to specifically affected customers. The need to rapidly disseminate this information to users often prevents the production of high-quality multimedia data. Instead, simple text, HTML, or the like are used to convey current security information. Rich multimedia content on such topics, if generated at all, may only be generated much later, after recording and producing video to convey the information.

Accordingly, there is a need to provide more current network security information that is reliable and can be trusted, including near real-time video information describing security events and network status. Current systems may not sufficiently provide multimedia content to currently, reliably and accurately describe an event, such as a system or network status update, and current internet security threat, or related breaking news item. Such multimedia data may be merely posted passively for users to observe, or may instead be transmitted to subscribers only after the lengthy production of a multimedia presentation.

SUMMARY

According to one aspect of the present disclosure, security related data may be received at a server or central location, such as, for example, a network security data center. The security related data may originate from internet monitoring software, information feeds, other news sources, security and industry experts, or from mobile units associated with the data center describing security-related news from an "on-the-scene" prospective. The source of the information may be verified and determined to be trusted before the information content itself is forwarded on to users.

According to another aspect of the present disclosure, video content may be produced and multi-cast or broadcast over an internet security news network (ISNN). By multi-cast, as used herein, is intended the transmission of internet security data to a selected group of users. By broadcast, as used herein, is intended both multi-cast and general broadcast to a wide body of terminals that may or may not be users of the internet. Production may include verifying the source of the internet news information, scripting, recording, and editing video segments, such as newscasts, features, interviews, and discussions with experts. Production may also involve a forensic analyst receiving and analyzing security-related data recently received at the data center. The forensic analyst, alone or with the assistance of a production team, may then quickly script and record a security alert or news update related the new information. Thus, produced video content may be pre-produced and pre-scheduled, or rapidly created in response to changing internet security conditions as part of a near real-time incident response security alert (e.g. internet security alert). Consequently, a predetermined group of users of the internet news information may receive multi-cast transmissions of the security news alerts and these may be provided over secure transmission facilities at least requiring a user identifier and password to retrieve.

According to another aspect of the present disclosure, the video content may be scheduled and broadcast as part of a continuously broadcasting news channel. The news channel may be broadcast 24/7 over cable television, satellite, or as a webcast accessible through a web portal. A default video recording or video stream may be sent to subscribers until a produced video segment is ready to be aired. The produced video segment, such as a pre-scheduled feature program or a more urgent incident response security alert, may supersede the default programming to provide more specific information about a particular topic or security incident, such as an internet virus.

These and other aspects of the disclosure will be apparent upon consideration of the following detailed description of illustrative embodiments.

BRIEF DESCRIPTION OF THE DRAWINGS

Figure 1:
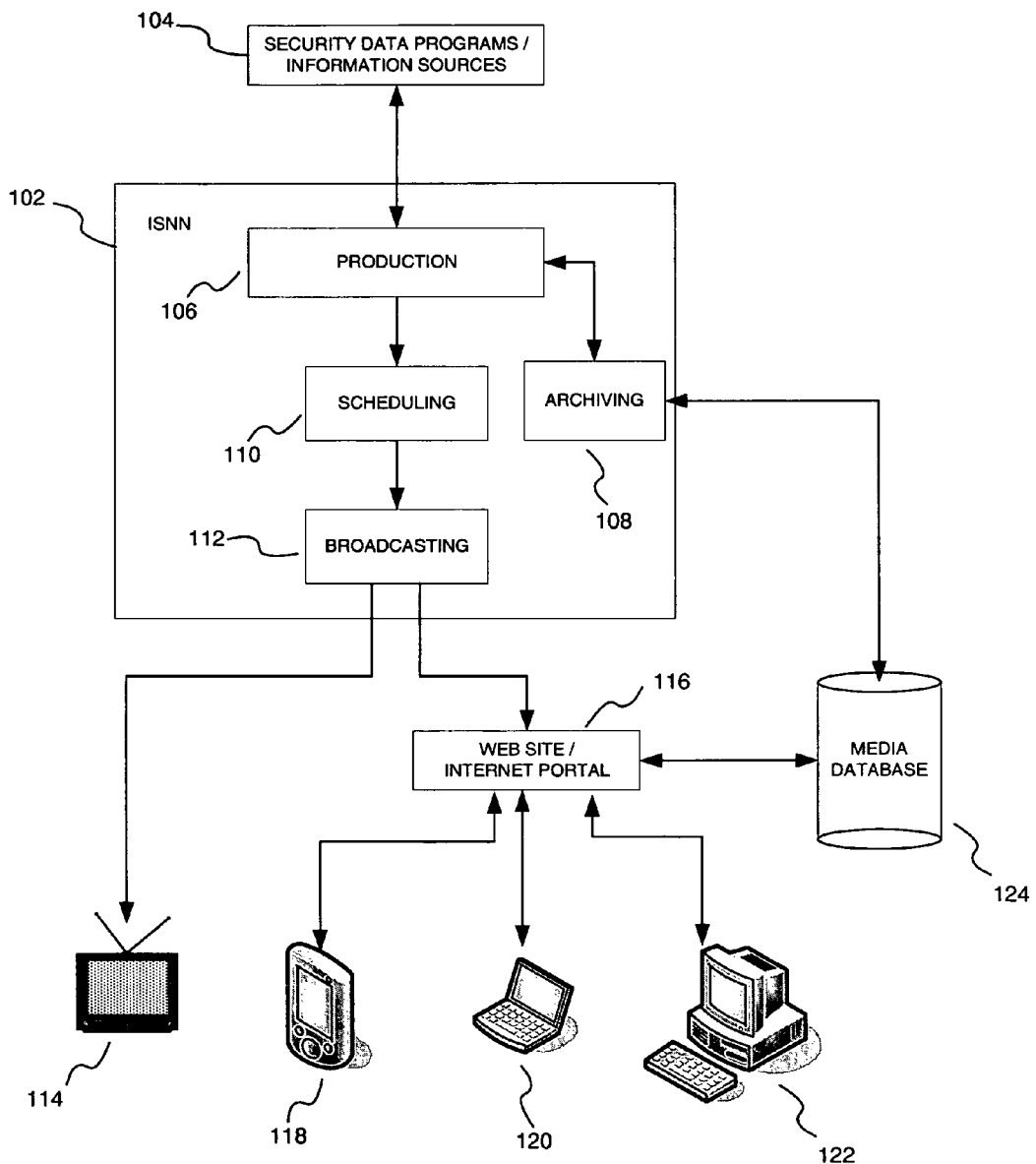
Figure 2:
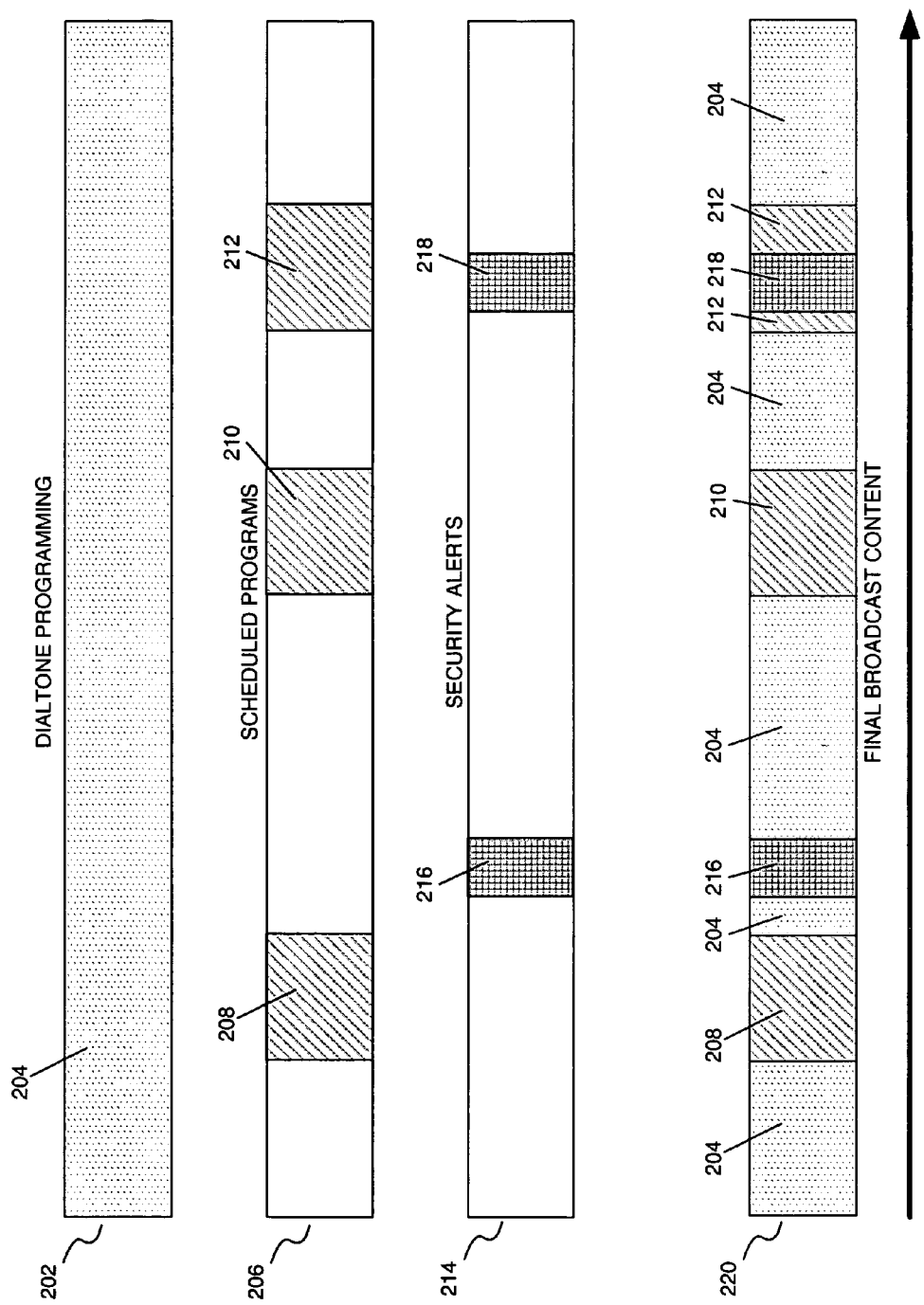
Figure 3:
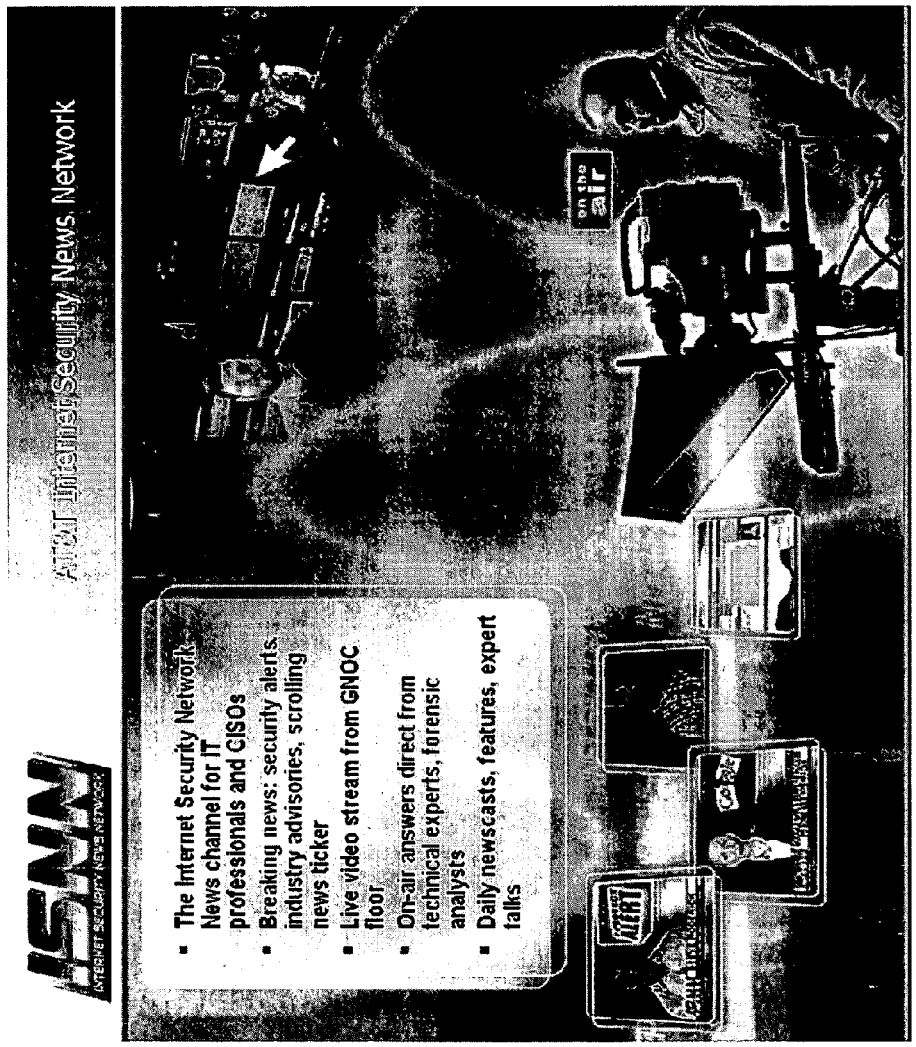

Having thus described the invention in general terms, reference will now be made to the accompanying drawings, which are not necessarily drawn to scale, and wherein:

FIG. 1 is a schematic block diagram showing a system architecture, in accordance with an embodiment of the present disclosure;

FIG. 2 is a block diagram showing an illustrative method of scheduling programming, in accordance with an embodiment of the present disclosure; and FIG. 3 is a graphical screen shot showing promotional material relating to AT&T's Internet Security News Network, in accordance with an embodiment of the present disclosure.

DETAILED DESCRIPTION OF ILLUSTRATIVE EMBODIMENTS

Illustrative embodiments will now be described more fully with reference to the accompanying drawings. The embodiments set forth herein should not be viewed as limiting; rather, these embodiments are provided merely as examples of the concepts described herein.

FIG. 1 is an architecture diagram in accordance with certain illustrative embodiments. This example is based on the architecture of the AT&T Internet Security News Network (ISNN) 102, AT&T's InternetProtect®, and AT&T's BusinessDirect® software platform. The ISNN 102 may receive security-related information from a security data program or other source 104. This security information may come from a variety of different local and remote sources, which may operate inside the data center or may be transmitted from external content providers or mobile units. For example, the data center may receive information indicating that there is a security issue caused by unauthorized use of the network. The data center may use highly specialized programs, which are run and monitored by trained network analysts, to detect such intrusions. At the data center of the ISNN 102, the personnel who monitor the network and apply the program may be referred to as forensic analysts, or forensic specialists. These forensic analysts may verify the source of the internet security news through various well-known methods and procedures. As another example, the security data source 104 may be an external internet traffic-monitoring program, which periodically transmits internet health and/or traffic reports to the data center. This traffic-monitoring program may be "trusted" and its output data encrypted, if necessary, to secure the data against intrusion by hackers. In yet another example, the external security data source 104 may include security experts who may communicate with personnel at the data center to provide industry news, tips and techniques for IT professionals, or analysis and commentary related to security information receives from other trusted sources 104.

Upon the receipt of security information, the production component/personnel 106 in the ISNN 102 may produce a video segment to describe the security information. As described below, default video content, or "dialtone," may be a continuous broadcast of the data center itself, along with updated scrolling information or graphics. This dialtone program may be interrupted by pre-scheduled and pre-produced programs, or near real-time alert information based on security information recently received at the data center. Video segments which are produced and ready to air may be delivered to the program scheduling component/personnel 110 of the ISNN 102. Programs may be scheduled, for example, in weekly time slots, while urgent security alerts may be scheduled to air as soon as they are produced, or may even air live as they are recorded in the ISNN data center 102, or by a mobile production unit 106 associated with the ISNN data center 102.

When a security alert happens, a designated forensic analyst for a given work shift may acquire the information about the alert and may quickly develop the information into a video script using a script template. This video script can be reviewed by others, before the analyst goes on-air with the information. That is, the analyst, supported by a production crew that may include a technical director and camera operator, will read the video script on camera, providing a descriptions, analysis, and commentary regarding the security alert information.

For example, when a forensic analyst in the data center may become aware of a new internet virus substantially affecting customer systems. After validating and analyzing the received data, the forensic analyst may write an alert script and record the security alert corresponding to this information. The script may include the following information: protocols affects by the virus, definitions of key terms not commonly known to IT professionals, the install location of the latest virus protection software, the install location of a patch specific to this virus, and other recommendations and general information relating to this virus, or virus response in general. To give the presentation a more professional and engaging appearance, the analyst may be trained to deliver reports on camera, and may read the script from a teleprompter at a news desk configured for lighting control, audio quality, and a changing graphical background. In certain embodiments, the analyst may use an automated turnkey system to operate a teleprompter, camera, and graphical background without assistance from a production staff.

In other examples, the video production components/personnel 106 of the ISNN 102 may include on-location filming or audio recording. For example, a mobile unit, including a camera, lighting, and sound equipment, may create an incident response alert that shows a forensic analyst on camera at a field location related to the alert report, such as, for example, at a company affected by the internet security issue. Alternatively, a forensic analyst or expert consultant may deliver an incident response alert over the telephone, and the video segment for the alert, produced back on the ISNN data center 102, may include the voice playing behind still photo of analyst or expert. Alerts filmed remotely, or any program recorded from two different locations, may also use a split screen, with a single camera setup at each location. In one example, the first location may be the set of AT&T's Global Network Operations Center® (GNOC) studio, while the second location may be a field location.

The following is a sample script prepared by AT&T:

"Internet Protect has observed an substantial increase in the scanning of port 143/tcp. Port 143/tcp supports a common service named IMAP Mail server. An exploit for MailEnable IMAP Service, Remote Buffer Overflow Exploit v0.4 has been discovered. The MailEnable software provides an enterprise mailing platform for Microsoft Windows NT/2000/XP/2003 systems. Two vulnerabilities were discovered, including a buffer overflow and an object pointer overwrite. So, if you are listening to this broadcast and wondering what this all means for you, then take out your pencil and paper, and I'll tell you what's hitting your network now, and try to summarize our recommendations. First of all, if you are using the MailEnable software, a patch is available at http://mailenable.com/hotfix/MEIMAPS-HF041125.zip. Install this patch immediately. Otherwise, to avoid infection, check with the local administrator whether the traffic to port 143/tcp can be blocked and remote users accessing email can use SSL wrapped IMAP on port 995/tcp. Make sure that all virus protection software is up to date and a full scan is performed on all machines. Be sure that the latest patches have been applied to the machines. Configure your email server to block file attachments with extensions used to spread viruses, such as .vbs, .bat, .exe, .pif and .scr. Educate users on the dangers of opening emails and/or attachments from unknown senders/unexpected senders. Do not install any Internet downloads without first scanning them for virus. Establish a complex, alpha-numeric password policy".

As is discussed below, the on-air broadcast may be a cable television, satellite, or an internet broadcast, or webcast, over a channel on a website monitored by customers. The video content, produced in one of AT&T's studios, may need to be produced rapidly when the security information relates to an urgent virus or other internet security issue. The content may be tailored for IT professionals, who may understand networks and security extremely well. These customers may monitor the web channel and view it as their window on the latest alert information. Thus, not only will such viewers be able to read information on the website, they will be personally addressed by one of AT&T's network security specialists and so the content may be multicast to a predetermined group of users who have subscribed to an internet security news alert service.

Once a video segment is produced, an archiving component/personnel 108 in the ISNN data center 102 may archive the video segment, such as a pre-produced weekly security program, or a new security alert. Archived multimedia data may be collected in a media database 124, and may be made subsequently searchable /retrievable by users after its initial broadcast over the ISNN 102. This archived data may be displayed as links at the web portal's published web site. The production component/personnel 106 may also access the archived media content for rebroadcast and incorporation into future video segments. The media database 124, as well as other essential data of the ISNN data center 102 may be periodically backed up the by the ISNN technology support team. This technology support team may also perform systems maintenance and troubleshooting for the ISNN systems.

A broadcasting component/personnel 112 of the ISNN 102 is responsible for transmitting the video content to viewers/users/subscribers. This video broadcast may be available via DirectTV® or cable television, for example, via Comcast®, on a standard a 24/7 programming schedule. In certain illustrative embodiments, a subscriber address may represent the internet address of a user terminal, or may be a physical home or work address, a telephone number associated with the subscribing user, a television channel address or other subscriber address known in the art. Subscribers may register multiple subscriber addresses that may each receive the broadcast, or the multiple subscriber addresses may be ranked in a priority list so that if the primary subscriber address is unreachable by a broadcast or alert, the next address will be used, and so on. Such a subscriber list may be stored as part of the user preferences, which may be stored for some, IT professionals or other subscribers. User 114, for example, may view the ISNN 102 video content on a cable or satellite television channel with support for on-demand, and personalized playlist capability.

The broadcasting component 112 of the ISNN 102 may include multicasting or broadcasting the video content through a web server 116, such as, for example, the web portal for AT&T's InternetProtect®. By accessing this web portal, users 118, 120, and 122, may log in and/or view the currently broadcasting video content from the ISNN 102 over a PDA, laptop computer, desktop computer, or other device connected to the internet without having to log in.

Computing devices may also access the web portal 116 to retrieve and view archived video content, such as previously aired video segments which have been stored in the media database 124. For example, an AT&T InternetProtect® user may view the available archived video from the top menu bar of the homepage via a menu item entitled "Video Reports." The user may click on Video Reports to display a secondary page of archived video reports, identical to the behavior of the "Alerts and Advisories" menu items on the same top menu bar. The secondary page with the archived reports list may behave in the same way as the Alerts and the Advisories pages. That is, the user can click on particular video report in an alphanumeric list, sorted corresponding to an Alert or Advisor number from the InternetProtect homepage.

In certain embodiments, this video content may be archived and searchable for a proscribed period of time, after which users 118, 120, and 122 may no longer access the information via the web portal 116. This period of time may depend on the production date of the information, a predetermined expiration data of the information, or may involve making security news and alert information available only as long as the underlying data is still accurate.

Additionally, users 118, 120, and 122 viewing the multicast or broadcast through the web portal 116 may be able to play, pause, or rewind the broadcast while they view it. Web portal broadcasts, or webcasts, may also support links to user surveys related to technical aspects of the ISNN 102, as well as surveys directed to the programming content.

When broadcasting to customers through the web portal 116, the ISNN data center 102 may compile a list of user addresses that should receive the broadcast. In certain embodiments, the users selected to receive a particular video segment, such as for example, a specific security alert, may not be all of the webcast receiving terminals. While in the case of a large-scale security event, it may be desirable to immediately notify all subscribers/users, other security alerts may only be relevant for particular system users. In many instances, the webcast recipients may be information technology (IT) professionals responsible for security and stability of organizational data systems. Since different organizations, depending on the size and sophistication of the organization, may have dramatically different information requirements, the criteria for selecting webcast recipients for a particular video segment may depend on, for example, the user's system hardware, platform, server software. Other additional factors may determine which users receive different programs or security alerts, such as the geographic location of the user's system, or the individual preferences of the IT professionals representing the organization. In certain embodiments, a webcast viewer may have an opportunity to choose the categories of alerts that they would like to receive, and may be able to register and un-register for specific programs.

Customers with low-bandwidth equipment may be able to access the live broadcast or archived data as audio-only presentations. For example streaming audio or downloaded audio, corresponding to the broadcast of a security alert, may be sent to a mobile device.

Referring to FIG. 2, a block diagram is shown demonstrating video content that may be broadcast by the network security data center. As is shown in FIG. 2, there may be at least three different components which may be combined into a single continuous video broadcast 220. Block 202 includes the dialtone video content 204, that is, the content that will be broadcast during periods of time when no other specific security programming is scheduled, and no security alert is being reported. This dialtone may be, for example, a live view of the network security data center, such as the floor of AT&T's GNOC. The feed showing the GNOC floor may continue until a scheduled program or security alert is ready to be broadcast, at which time the dialtone view of the GNOC floor may be superseded, or interrupted, by the program or incident response security alert. During the dialtone video segments, in addition to the GNOC floor, a scrolling information "zipper," or other on-screen graphics displaying current network or security information. For example, a zipper may be programmed and displayed using content from an AT&T Cyber Intelligences® report and various other sources, as approved by the data center forensics team.

Block 206 represents the pre-produced and pre-scheduled security-related programs which may be periodically broadcast over the network. A programming schedule may be predetermined by the channel producers and distributed to customers or posted on a web site related to the broadcast channel. Since scheduled programs are pre-produced, such programs may be scheduled for broadcasting on a weekly, daily, or hourly schedule, and may be consistently broadcast at the same relative time and in the same format to attract and retain viewers for that particular program. Several examples of security-related scheduled programs are described below, under the "Programs" heading.

Block 214 represents security alerts which may be broadcast over the channel at any time, possibly superseding the dialtone programming, or superseding a pre-scheduled program. Since security alerts represent the most recent information available, and often require of a rapid dissemination of this information, they may be quickly produced and broadcast, or even broadcast live over the channel. Thus, the incident response security alerts may have rapid data analysis and minimal production time, and little or no delay between completion of the internet alert video segment and its broadcast over the channel.

Block 220 represents the video content which will be broadcast over the channel during the time period shown in this example. The broadcast is continuous, that is, even when no security alert or scheduled program is being broadcast, viewers will see the dialtone programming 204. The pre-recorded, and pre-scheduled programs 208, 210, and 212 may periodically interrupt the dialtone programming 204. Incident response security alerts 216 and 218 may interrupt either the dialtone programming 204, or a pre-scheduled program airing on the channel when the security alert is information is received at the data center. In this example, security alert 218 was received during a scheduled program 212. The program 212 may be superseded by the internet alert 218, so that viewers will not see the scheduled program 212, but instead will see the current, and possibly urgent, security alert 218. In alternative embodiments, the scheduled program 212 may be paused, and may resume from the point its broadcast was first interrupted by the security alert 218. In further alternative embodiments, the incident response security alerts 216 or 218 may be encrypted requiring decryption software to decrypt, for example, any known single, double or triple layer encryption/decryption software to prevent against hacking.

Referring to FIG. 3, a graphical screen shot is shown of promotional material relating to AT&T's Internet Security News Network, in accordance with an embodiment of the present disclosure. This promotional material illustrates several different examples of ISNN programming. These ISNN programs, and the several other program descriptions following, are not a complete list of ISNN programming content, but are merely illustrative embodiments described to illustrate possible uses of the ISNN.

Programs

1. Live Image of the GNOC. The ISNN 102 may broadcast a 24 hour, 7 day a week, live feed of the AT&T GNOC. This feed, along with several potential scrolling zippers or other on-screen graphics, may represent the ISNN dialtone broadcast. As discussed above, this program may be superseded by a scheduled program, such as those discussed below, or by an incident response security alert report created in response to new security data received at the ISNN data center 102.

2. Daily Newscast. The ISNN 102 may broadcast one daily special report, summarizing recent developments and news in the fields of internet security. This report may be a news broadcast/webcast, recorded by anchor or forensic analyst in the ISNN data center. This report may be near-live, with a minimal content approval delay.

3. Expert Interview. The ISNN 102 may broadcast a weekly interview of an internet security expect, for example, an AT&T expert. This program provides the network an expert presence, and may be separately marketable to other broadcast networks and news venues. This interview may run approximate five minutes in length, and include static screen shots, and no location roll. The interview may be current events oriented, such as discussions of technical innovations, or reflections on recent events in a perspective piece.

4. Customer Interview. The ISNN 102 may broadcast a weekly interview of an AT&T customer, to demonstrate customers outreach and to attract audience involvement. The interview may discuss the customer's weekly experiences, typical issues, and typical solutions, possibly including AT&T proactivity and involvement.

5. Monthly Feature. The ISNN 102 may broadcast one or more monthly feature programming segments. These segments may be five to seven minutes long, and may report on an in-depth study of a single network issue. Such monthly features may not be as time-sensitive or specific as security alerts or other news updates, but may review issues in greater detail and depth. For example, the ISNN 102 may produce and broadcast a segment entitled, "Overview of VoIP and Where VoIP Is Heading," which includes on-location footage.

6. "In the Hack." The ISNN 102 may broadcast a weekly program featuring discussion among a roundtable of experts, regarding recent computer-related news and events.

7. "Ask the Expert." The ISNN 102 may broadcast a viewer call-in program featuring an a internet security expert fielding customer calls and questions submitted through the web site or over email.

8. "Weather on the 5's." The ISNN 102 may broadcast an hourly internet "weather report" to describe current internet traffic conditions, virus activity, system vulnerability, and other current internet information. This program may report one or more composite indices periodically computed based on system and network monitoring programs. For example, this weather report may include the current Threat Reconnaissance Index (TRI) value, which is based on the Reconnaissance Index®, developed by AT&T, functions as a gauge of malicious activity on the internet. The report may further break down the score of each component of the TRI and demonstrate the computation of the complete TRI composite value. In this example, the TRI may indicate the relative quantity of sources and relative quantity of reconnaissance probes on the internet. Reconnaissance probes, which may be manual or automatic, attempt to identify hosts, or target IP addresses, that may be vulnerable for exploit. In this example, the TRI value generation processes counts the number of unique hosts, or source IP addresses, performing scanning and counts the number of probes associated with that scanning. The processing then applies a formula and weighting factors to measured counts to provide a relative measure of activity. These measurements may be taken periodically over time. A series of measurements may be use to evaluate the general trends in activity, or to provide a measurement of the level of attack-reconnaissance activity on the internet. Measurements may be taken on an hourly basis, so that the current TRI value, as well as the current TRI trend, may be reported and analyzed for customers during this weather report. Other indices may similarly be generated and reported during this weather report, including another index, or a variation of the TRI, that is only calculated on a daily or weekly basis.

While the foregoing descriptions and the associated drawings may relate to a internet security news network, the present disclosure is adaptable to the many modifications, for example, stock tickers, traveler information systems, emergency preparedness, and other embodiments that will come to mind to one skilled in the art, having the benefit of the teachings presented.

What is claimed is:

1. A method for multicasting internet security news to subscribers of an internet security news network, comprising:
    receiving data relating to internet security, said receiving data relating to internet security including receiving an information feed, said information feed including a video presentation by a forensic analyst, said video presentation including one or more of protocols affects by a virus, install locations of virus protection software, and install locations of a patch specific to the virus; and
    multicasting video content based on said data relating to internet security to subscriber addresses associated with said subscribers of the internet security news network, the subscriber addresses determined by comparing predetermined user preferences of said subscribers with a category associated with said data relating to internet security;
    wherein said subscriber addresses comprise one or more of a telephone number, an internet address, a physical business address, a physical home address, and include a television channel address;
    said multicasting comprising a webcast available to subscribers through a web portal; and
    archiving said video content and publishing links at the web portal enabling subscribers to access said video content after said multicasting to subscriber addresses; wherein
    said data relating to internet security comprising an index value based on at least one of internet traffic, internet virus activity, and a test of internet systems for security vulnerabilities; and
    said index value comprising a Threat Reconnaissance Index (TRI) value.

2. The method of claim 1, said video content comprising graphics describing at least one of the composite index value, the index trend, and the individual components of the index.

3. The method of claim 1, wherein said information feed describes an incident response security alert, transmitted from a mobile unit, the location of said mobile unit being related to an incident response security alert.

4. The method of claim 1, further comprising the step of verifying the source of the internet security data.

5. The method of claim 1, further comprising the step of decrypting encrypted internet security data.

6. A method for broadcasting internet security news, comprising the steps of:
    transmitting default video content over a broadcast channel;
    receiving, at an internet security data center, data relating to internet security;
    producing video content based on said data relating to internet security, said video content including one or more of protocols affects by a virus, install locations of virus protection software, and install locations of a patch specific to the virus;
    interrupting the transmitting of said default video content; and
    transmitting said produced video content over said broadcast channel to subscriber addresses associated with said subscribers of the internet security news network, the subscriber addresses determined by comparing predetermined user preferences of said subscribers with a category associated with said data relating to internet security;
    wherein said subscriber addresses comprise one or more of a telephone number, an internet address, a physical business address, a physical home address, and include a television channel address;
    said broadcasting comprising a webcast available to subscribers through a web portal; and
    archiving said video content and publishing links at the web portal enabling subscribers to access said video content after said broadcasting to subscriber addresses; wherein
    said data relating to internet security comprising an index value based on at least one of internet traffic, internet virus activity, and a test of internet systems for security vulnerabilities; and
    said index value comprising a Threat Reconnaissance Index (TRI) value.

7. The method of claim 6, said broadcast channel comprising a cable television broadcasting channel.

8. The method of claim 6, said default video content comprising a live video recording of said internet security data center.

9. The method of claim 8, said produced video content comprising a video recording of a news broadcast related to internet security, said news broadcast recorded at a dedicated internet security news studio.

10. A non-transitory computer-readable medium having computer-executable instructions for performing steps comprising:
    receiving internet security-related data from an internet security monitoring software program;
    analyzing said internet security-related data; producing graphical video content based on said internet security-related data, said graphical video content including one or more of protocols affects by a virus, install locations of virus protection software, and install locations of a patch specific to the virus;
    determining subscriber addresses, based on one of internet addresses of user terminals, a telephone number, a physical business address, a physical home address, and a television channel address associated with subscribers of an internet security news network; and
    transmitting said graphical video content to said subscriber addresses; wherein
    wherein determining said subscriber addresses comprises comparing predetermined user preferences of a subscriber with a category associated with said internet security-related data; and
    a webcast available to subscribers through a web portal;
    archiving said graphical video content and publishing links at the web portal enabling subscribers to access said graphical video content after transmitting to subscriber addresses; wherein
    said data relating to internet security comprising an index value based on at least one of internet traffic, internet virus activity, and a test of internet systems for security vulnerabilities; and
    said index value comprising a Threat Reconnaissance Index (TRI) value.

11. The non-transitory computer-readable medium of claim 10, wherein the transmitting said video content comprises a webcast.

12. The non-transitory computer-readable medium of claim 10, wherein said graphical video content comprises at least one of the composite index value, the index trend, and the individual components of the index.

13. The non-transitory computer-readable medium of claim 10, wherein said user preferences comprise a list of pre-scheduled security-related programs selected by the subscriber.

14. The non-transitory computer-readable medium of claim 10, wherein said user preferences comprise a category of incident response security alerts selected by the subscriber.

15. A method for producing internet security news content for multicasting to subscribers of an internet security news network, comprising:

receiving data relating to internet security; and producing video content based on said data relating to internet security, said video content for multicasting to subscriber addresses associated with said subscribers of the internet security news network, said video content including one or more of protocols affects by a virus, install locations of virus protection software, and install locations of a patch specific to the virus, the subscriber addresses determined by comparing predetermined user preferences of said subscribers with a category associated with said data relating to internet security;

wherein said subscriber addresses comprise one or more of a telephone number, an internet address, a physical business address, a physical home address, and include a television channel address, said multicasting comprising a webcast available to subscribers through a web portal; and archiving said video content and publishing links at the web portal enabling subscribers to access said video content after said multicasting to subscriber addresses; wherein said data relating to internet security comprising an index value based on at least one of internet traffic, internet virus activity, and a test of internet systems for security vulnerabilities; and said index value comprising a Threat Reconnaissance Index (TRI) value.

16. The method of claim 15, said producing step comprising recording a forensic analyst reading a script, said script comprising a description of an internet security alert and a location of a software patch associated with said security alert.

17. The method of claim 16, said script further comprising a description of computer systems potentially affected by the security alert.

* * * * *